(12) United States Patent
Hook et al.

(10) Patent No.: US 8,317,376 B2
(45) Date of Patent: Nov. 27, 2012

(54) ILLUMINATED BEZEL OF CHARGE PORT FOR ELECTRIC VEHICLE

(75) Inventors: Richard R. Hook, Hudsonville, MI (US); David A. Dingman, Grand Haven, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 439 days.

(21) Appl. No.: 12/731,394

(22) Filed: Mar. 25, 2010

(65) Prior Publication Data

US 2010/0246198 A1  Sep. 30, 2010

Related U.S. Application Data

(60) Provisional application No. 61/164,134, filed on Mar. 27, 2009.

(51) Int. Cl.
*B60Q 1/00* (2006.01)

(52) U.S. Cl. ........ 362/459; 362/486; 362/487; 362/540; 320/107

(58) Field of Classification Search .................. 362/459, 362/486, 487, 540, 496, 509, 311.01–311.05; 320/107, 109, 114, 115
See application file for complete search history.

(56) References Cited

U.S. PATENT DOCUMENTS

| | | | | |
|---|---|---|---|---|
| 4,214,683 | A * | 7/1980 | Wills et al. | 224/42.2 |
| 5,401,174 | A * | 3/1995 | Hansen | 439/34 |
| 6,371,768 | B1 * | 4/2002 | Neblett et al. | 439/34 |
| 6,459,234 | B2 * | 10/2002 | Kajiura | 320/109 |
| 7,789,523 | B2 * | 9/2010 | Arnold, III | 362/183 |
| 8,134,334 | B2 * | 3/2012 | Suzuki et al. | 320/107 |

* cited by examiner

*Primary Examiner* — Bao Q Truong
(74) *Attorney, Agent, or Firm* — Gardner, Linn, Burkhart & Flory (57) ABSTRACT

A pocket assembly is provided for mounting at a recess of a vehicle body where a charge port of the vehicle is located, the pocket assembly has a body mountable to a vehicle, wherein the body has a base portion and a bezel portion, at least one outer layer established at an outer surface of said bezel portion, wherein the at least one outer layer is viewable at the side of the vehicle when the charge port is being accessed by a user of the vehicle and an illumination source disposed at or behind said bezel portion, and an illumination source being operable to illuminate indicia established at or on the bezel portion.

15 Claims, 14 Drawing Sheets

ILLUMINATED BEZEL OF CHARGE PORT FOR ELECTRIC VEHICLE

This application claims the benefits of U.S. Provisional Application No. 61/164,134, filed Mar. 27, 2009.

FIELD OF THE INVENTION

The present invention relates to charge port pockets for vehicles and, more particularly, to an exterior charge port pocket at a side or rear portion of an electric vehicle.

BACKGROUND OF THE INVENTION

An electric vehicle may include a pocket or recessed portion at which a charge port is disposed, whereby a user may plug a charging system or charger into the charge port to charge the electric vehicle's power source. Typically, such pockets are covered by a cover panel that is opened to access the port.

SUMMARY OF THE INVENTION

The present invention provides an illuminated bezel of a pocket of a charge port for an electric vehicle, for providing light at the charge port pocket of the vehicle.

According to an aspect of the present invention, a pocket assembly for a charge or fuel fill port of a vehicle includes a body mountable to the vehicle and at least one outer layer or element that is established at an outer surface of a bezel portion of the body and that is exposed and viewable at the side of the vehicle, such as when a person is connecting the vehicle to a charging system and optionally when a cover panel is opened to expose and access the charge port. The pocket assembly includes an illumination source or module that is operable (such as in response to opening of the cover panel or the like) to provide illumination generally at or behind the bezel portion and to illuminate and/or backlight indicia established at or on or through the bezel portion.

These and other objects, advantages, purposes and features of the present invention will become apparent upon review of the following specification in conjunction with the drawings.

DESCRIPTION OF THE PREFERRED EMBODIMENTS

Figure 1:
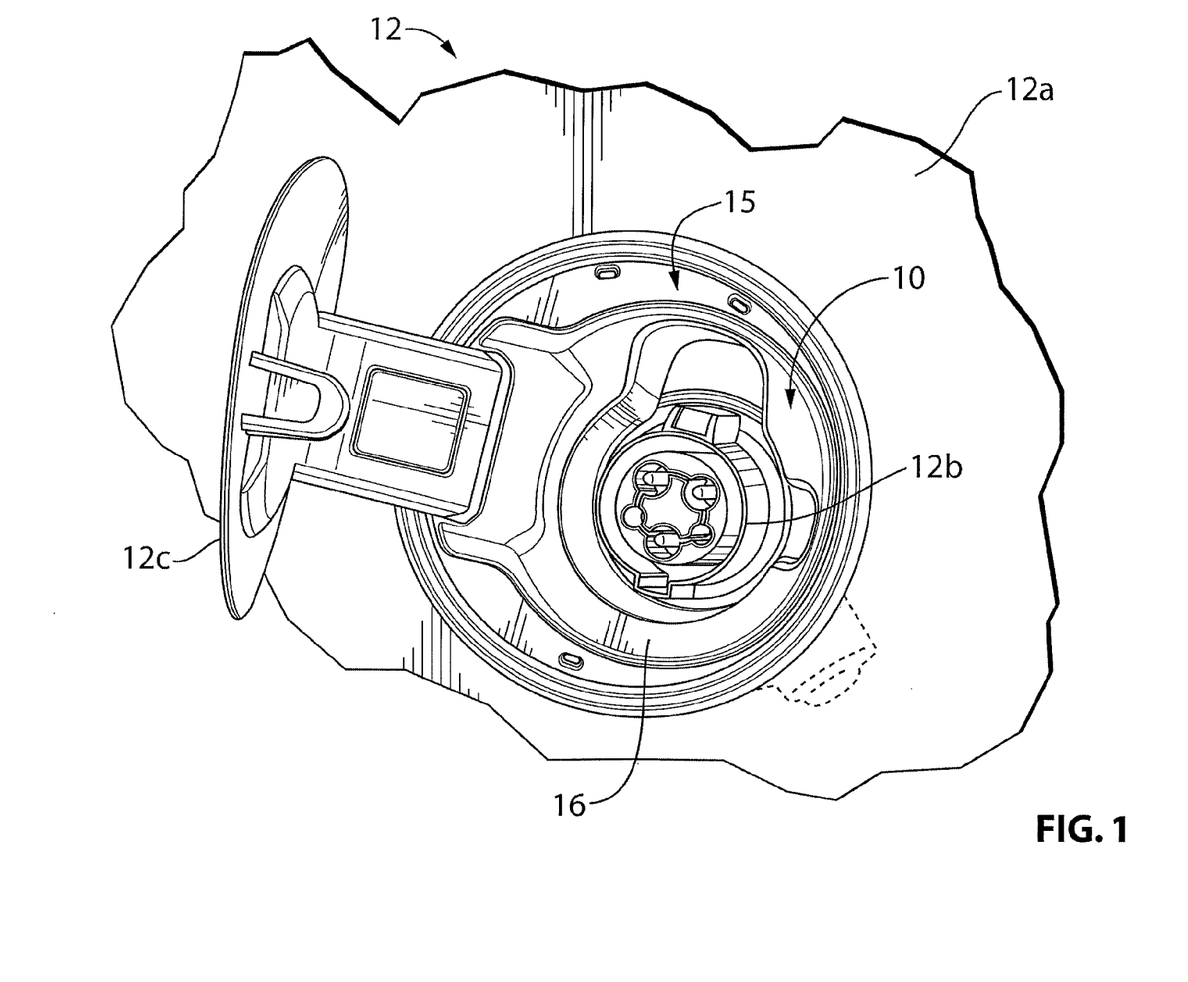
FIG. 1 is a perspective view of a pocket assembly in accordance with the present invention.

Referring now to the drawings and the illustrative embodiments depicted therein, a portal insert or pocket assembly 10 is mountable to a side portion 12a of a vehicle 12 at a charge port 12b of an electric vehicle (FIG. 1). Pocket assembly 10 includes a body portion 13, which includes a base portion 14 and a bezel portion 16 that is formed or disposed at an outer portion of the base portion 14 and that is exposed and viewable when the charge port is accessed to charge the vehicle. The pocket assembly 10 may be attached or fastened to a mounting structure 15 of the vehicle 12 that is received in a recess at the side portion 12a of the vehicle 12. The vehicle 12 may include a cover panel 12c that is closable over the pocket assembly 10 to conceal the pocket assembly 10 and charge port 12b when the vehicle is not being charged and that is openable by a user to access the charge port 12b to charge the vehicle. Pocket assembly 10 includes at least one illumination device or module 18 (FIGS. 3A-E and 4C) at or behind the bezel portion 16 (such as within base portion 14) for providing illumination at the charge port 12b and optionally for providing illumination or backlighting at indicia or characters or text 20 (such as a vehicle name or logo or emblem) at the bezel portion 16, as discussed below.

Figure 2:
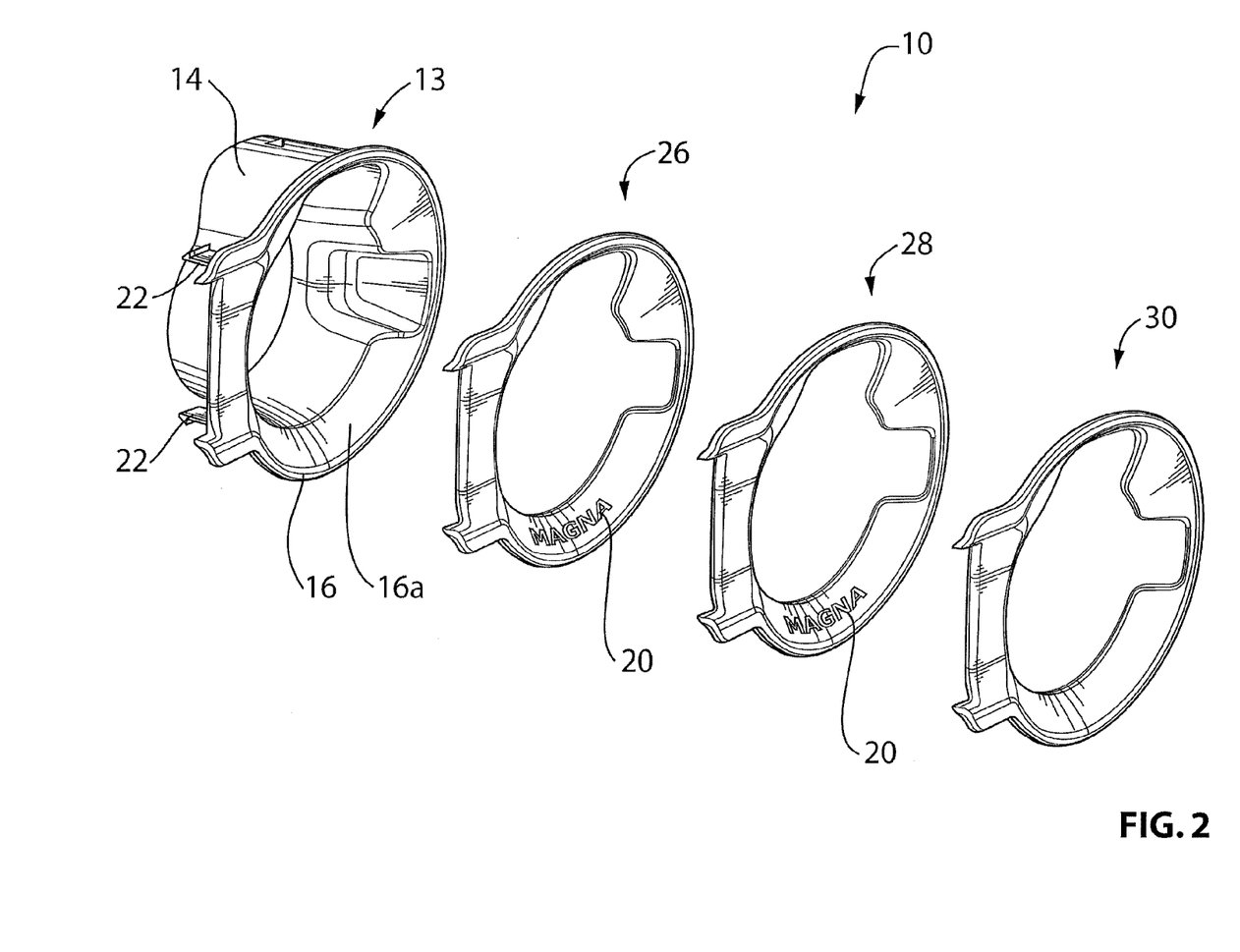
FIG. 2 is an exploded perspective view of a pocket assembly of the present invention.

As can be seen in FIGS. 1 and 2, the portal insert or pocket assembly 10 has a hole or aperture or passageway established therethrough for receiving a charge port or plug or socket 12b therethrough when the pocket assembly 10 is mounted to the mounting structure 15 at the side of the vehicle. The base portion 14 and/or bezel portion 16 of pocket assembly 10 may be mounted to the mounting structure 15 at the side of the vehicle (such as at a pocket or recess established at the side of vehicle body or frame) via any suitable attachment means, such as fasteners or snaps or clips or the like. For example, and as shown in FIG. 2, bezel portion 16 may include flexible tabs 22 with hooks at ends thereof, whereby the tabs may flex to insert into openings or the like at the mounting structure 15 to fixedly secure the pocket assembly 10 at the side of the vehicle. The vehicle and/or pocket assembly may include a cover 12c that is pivotally mounted to the vehicle and/or pocket assembly and that is pivotable by a user to access the charge port 12b for charging the battery or power source of the vehicle. The illumination device 18 of the pocket assembly 10 may be activated when the cover 12c is opened (such as in response to a switch or input that activates the illumination device when the cover is at least partially opened and deactivates the illumination device when the cover is closed) to illuminate the charge port area and/or to illuminate or backlight the indicia 20 at the bezel portion 16 of pocket assembly 10, thus providing enhanced access to the charge port and providing an aesthetically pleasing appearance to the charge port area to a person charging the vehicle. In the illustrated embodiment, the pocket assembly provides a colored portion at the indicia and/or colored portion of the base portion so that the illumination device 18, when activated, not only illuminates the indicia and charge port area, but does so in a manner that provides an enhanced appearance to the charge port area, as discussed below.

In the illustrated embodiment, and with reference to FIG. 2, base portion 14 of body 13 comprises a generally cylindrical wall portion or inner portion that is received in the mounting structure 15 at the pocket or recess at the side of the vehicle, with the bezel portion 16 of body 13 disposed or established (such as via unitarily molding base portion 14 and bezel portion 16 in a molding process, such as an injection molding process or the like) at an outer end of the base portion 14 and flaring outward to provide a surface that is generally viewable by a person at the side of the vehicle when the cover panel is opened. Optionally, base portion 14 and bezel portion 16 may be formed of a translucent plastic or polymeric material, such as, for example, a translucent blue material or resin (or any other color material depending on the particular application and desired appearance of the indicia and/or pocket assembly).

As shown in FIG. 2, pocket assembly 10 may include an opaque layer or coating 26, such as a layer of dark (such as black) paint or other suitable dark paint or layer or coating, established at an outer surface or portion 16a of bezel portion 16, with a lighter layer or coating 28, such as a layer of lighter (such as silver) paint or other suitable lighter paint or layer or coating, established over the dark or opaque layer 26, and with a clear coat or protective coat 30 disposed or established or applied to bezel portion 16 at and over the layers or coatings 26, 28. The layers 26, 28 may be established or coated or applied to the outer surface 16a of bezel portion 16, whereby the indicia 20 (such as the name or logo of the vehicle or vehicle manufacturer or any other text or icon or the like) may be etched through the layers 26, 28 (such as by laser etching or the like or otherwise removing or ablating portions of the layers in the desired pattern), so that the translucent blue resin (or other base and bezel material) of bezel portion 16 may be exposed and viewable at the laser etched indicia. Thus, the outer clear coat 30 provides a continuous outer surface and fills in or encompasses the indicia whereby the colored bezel portion 16 is viewable through the translucent or at least partially transparent clear coat 30 and through the indicia to provide colored indicia on a silver (or other colored) bezel portion.

Figure 3A:
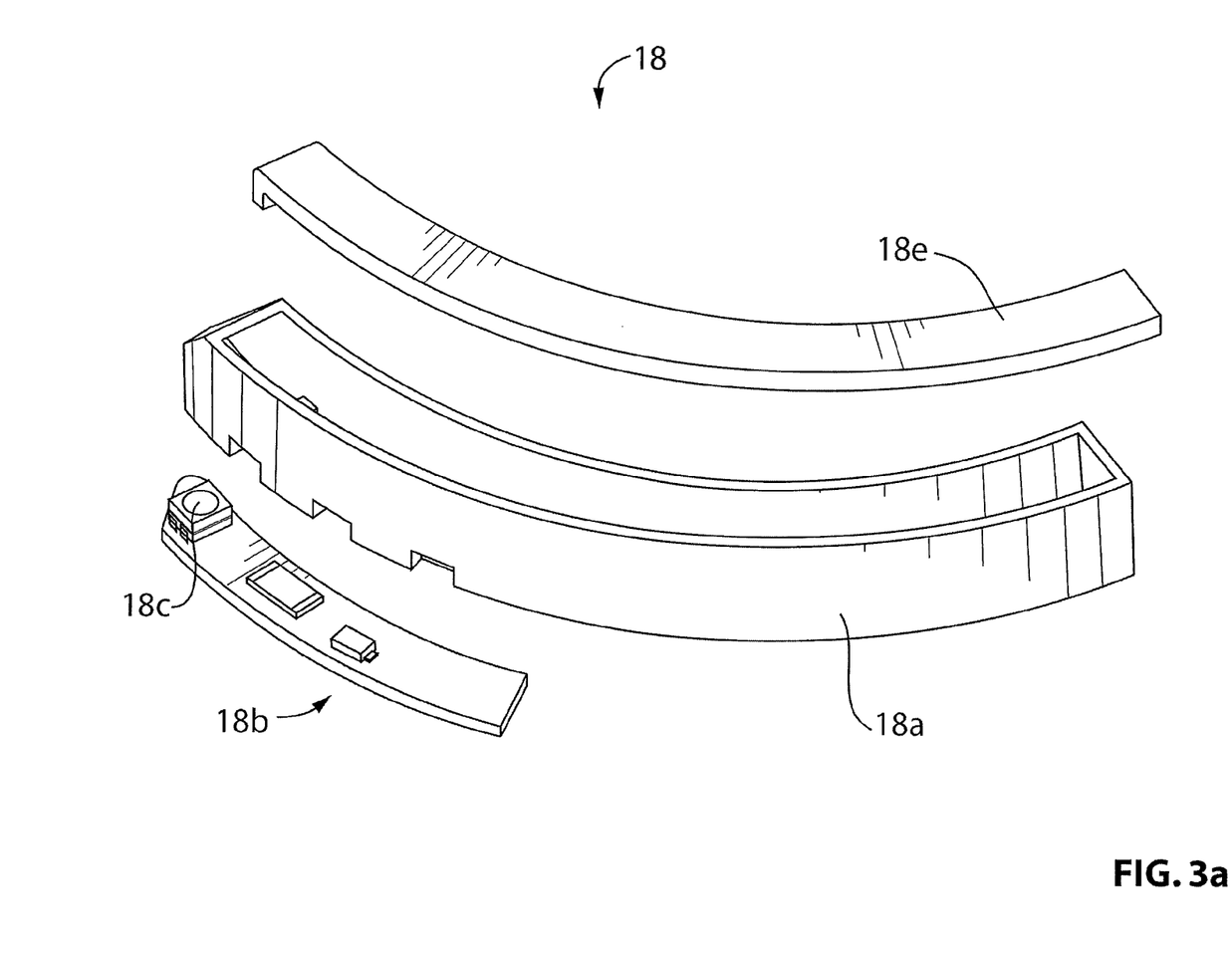
FIGS. 3A-E are views of an illumination source or light pipe and associated circuitry or circuit board suitable for use with the pocket assembly of the present invention.
Figure 3B:
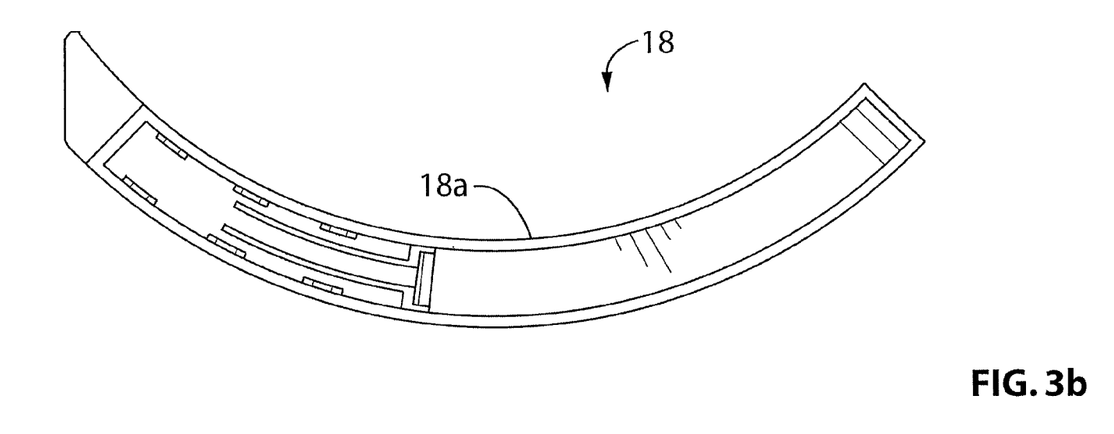
Figure 3C:
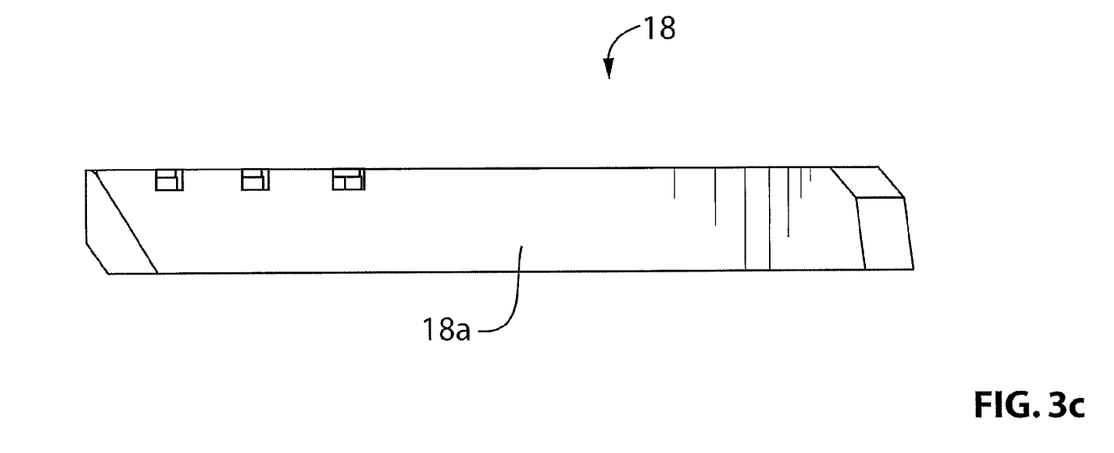
Figure 3D:
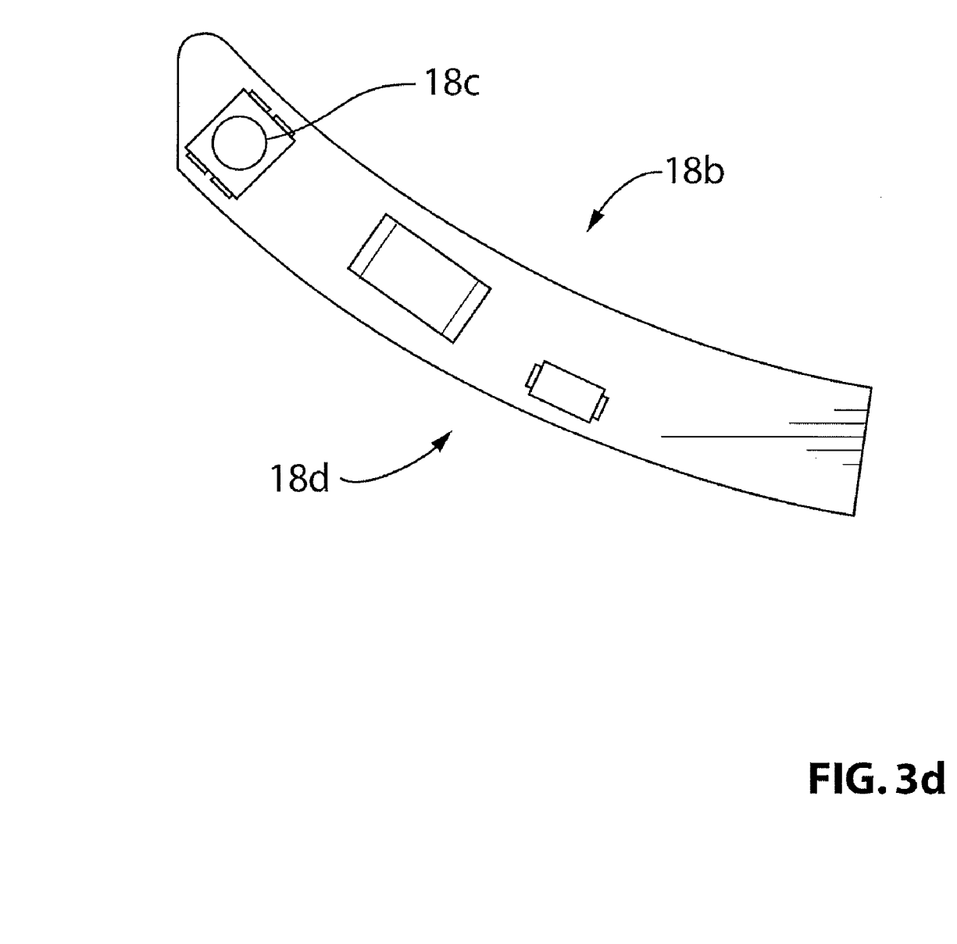
Figure 3E:
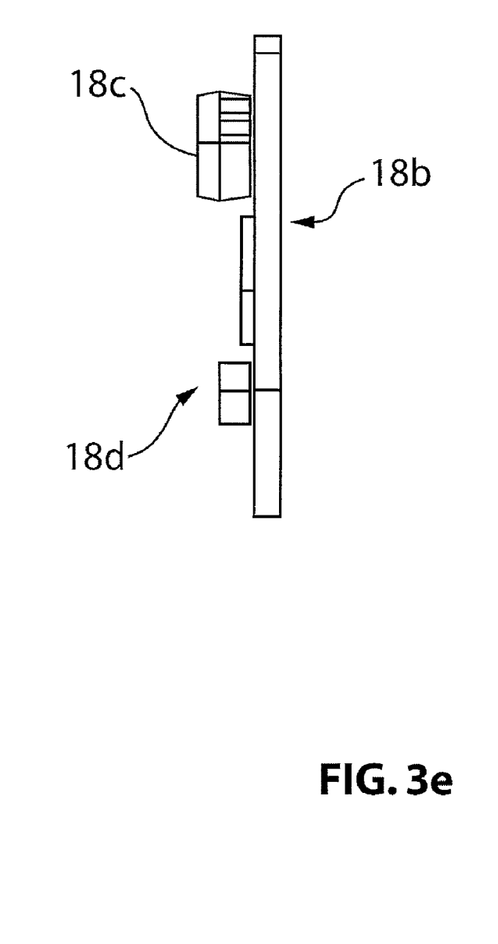

Illumination device 18 may be disposed or housed at base portion 14 and/or bezel portion 16, such as generally at or in or behind bezel portion 16 at or near the indicia 20. As shown in FIGS. 3A-E, illumination device 18 may comprise a light pipe or module, such as a curved light pipe having a housing 18a (FIGS. 3A-C) with a circuit element 18b (such as a printed circuit board or the like) with one or more illumination sources or light emitting diodes (LEDs) 18c and associated circuitry 18d disposed or established thereon (FIGS. 3D and 3E). The housing 18a may comprise a reflector housing and a light guide element 18e, so that light emitted by LED 18c is guided along light pipe 18 to provide diffuse lighting along the light pipe and along and behind the indicia 20. For example, the light pipe may include a single LED or multiple LEDs (such as three or four or more LEDs arranged along the light pipe), and may include a circuit board or may be boardless, with the illumination sources wired to the power source and/or circuitry remote from the light pipe. Optionally, the illumination device or module 18 may utilize aspects of the illumination modules described in U.S. Pat. Nos. 7,195,381 and/or 6,971,775, and/or PCT Application No. PCT/US08/062,347, filed May 2, 2008 and published Nov. 13, 2008 as International Publication No. WO 2008/137634, which are hereby incorporated herein by reference in their entireties.

Figure 4A:
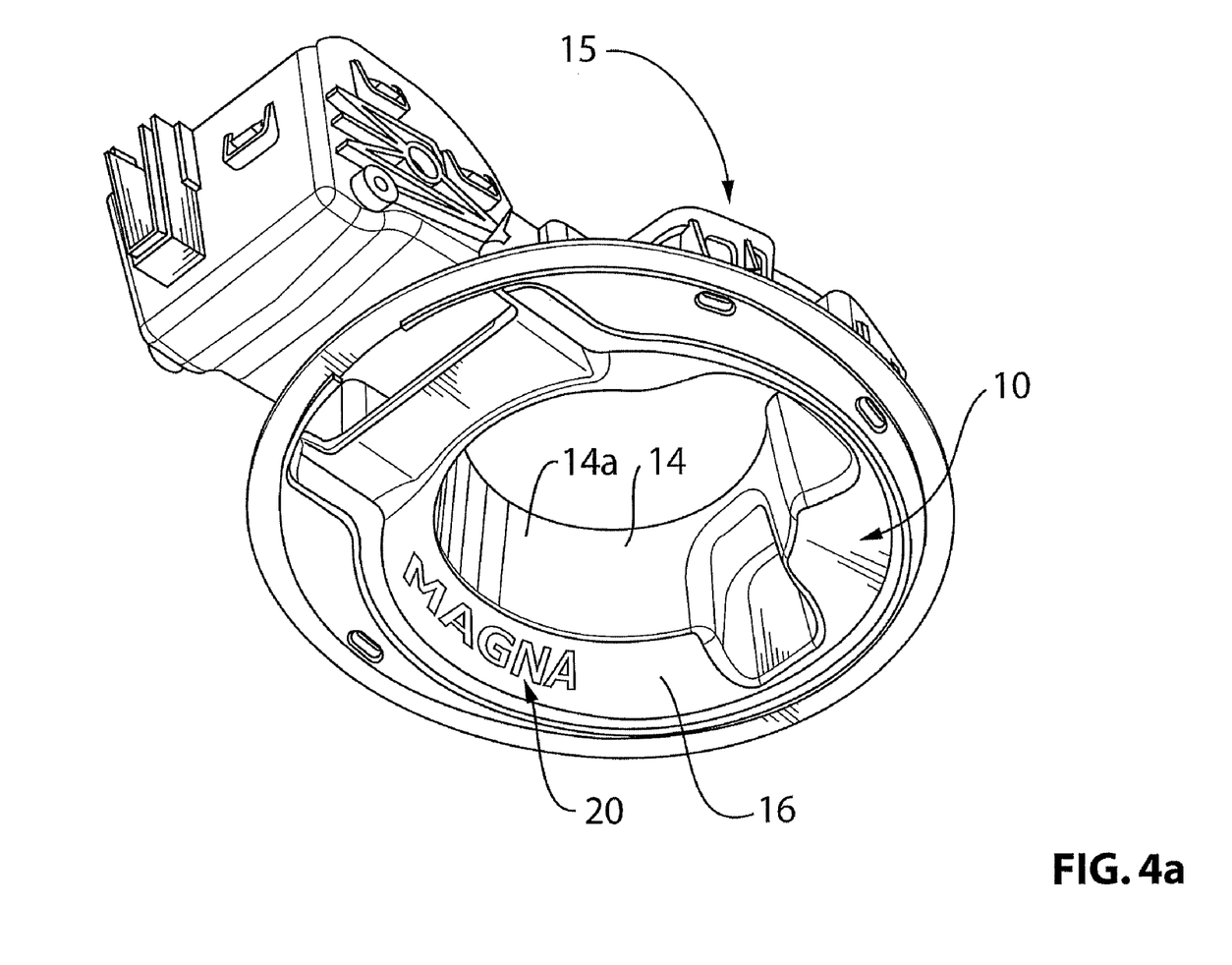
FIG. 4A is another perspective view of the pocket assembly of the present invention.
Figure 4B:
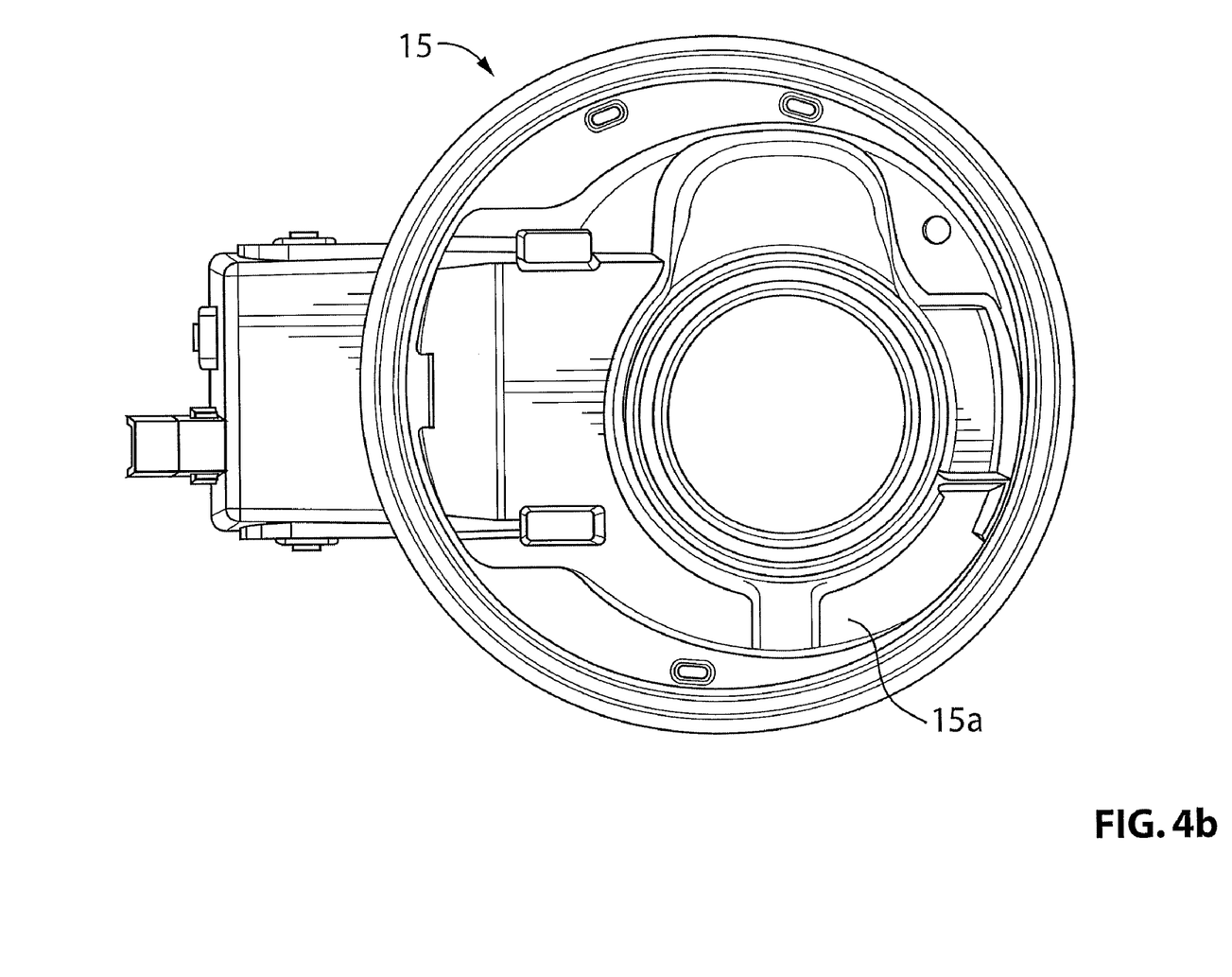
FIG. 4B is a plan view of a mounting structure suitable for use in mounting the pocket assembly of the present invention to a vehicle.
Figure 4C:
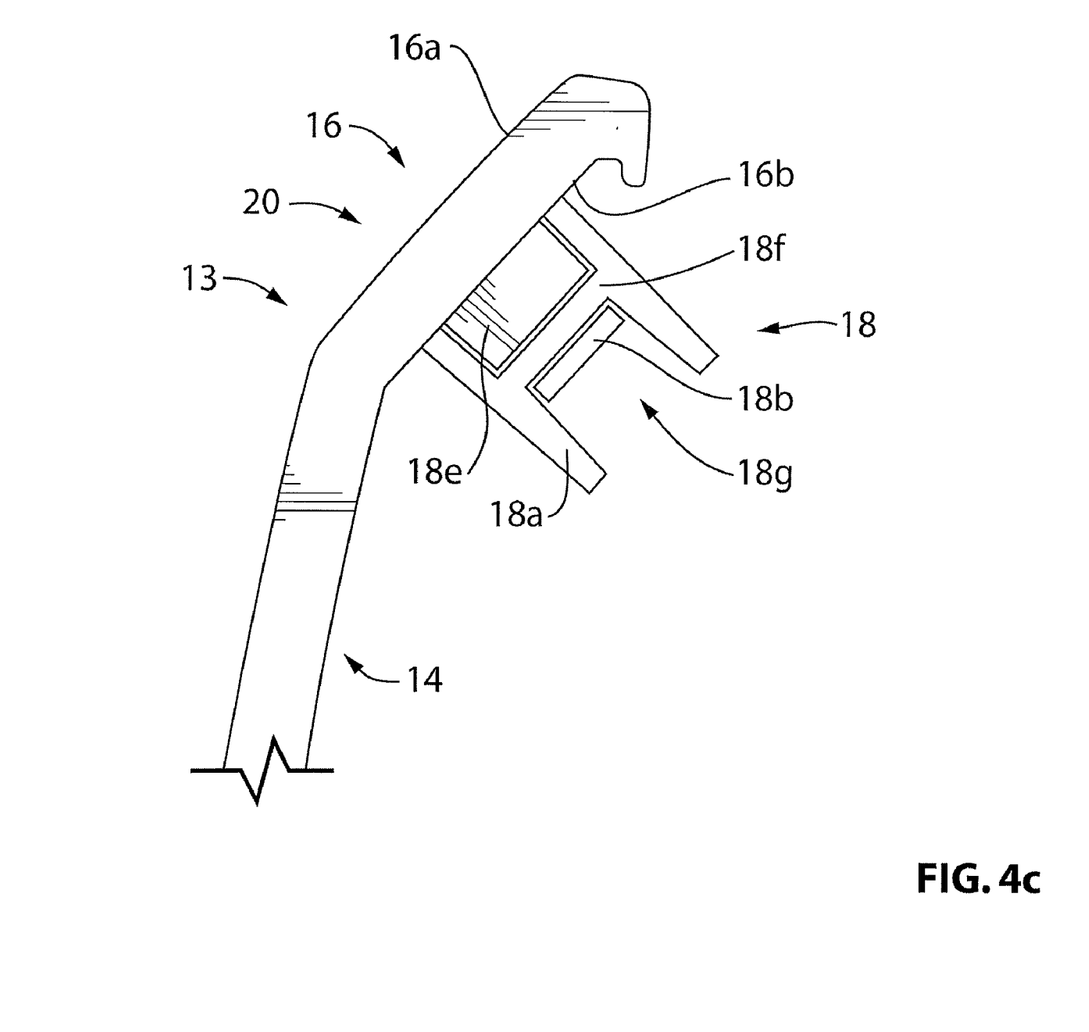
FIG. 4C is sectional view of the pocket assembly, showing the light pipe disposed within the pocket assembly and at the lower surface of the bezel portion.

Illumination device or module or light pipe 18 may be disposed at a receiving portion or underside 16b of bezel portion 16 and generally behind bezel portion 16. The light pipe is curved to generally match the curvature of the text or indicia 20 so as to provide substantially uniform illumination or back lighting at the indicia established at or on bezel portion 16. Optionally, for example, the bezel portion 16 may include snaps or tabs (not shown in FIG. 4C) that extend from the inner surface 16b of bezel portion 16 and that may snap to illumination device 18 (such as at or near the ends of the illumination device or elsewhere along the illumination device) to secure the illumination device at the underside or inner surface 16b of bezel portion 16. As shown in FIG. 4C, the circuit board 18b may be disposed in housing 18a (such as at a support portion 18f of housing 18a), whereby illumination from the LED may be emitted through an opening in support portion 18f and along light pipe element or light guide element 18e so as to emit light generally uniformly along and behind the indicia 20.

As can be seen in FIG. 4C, housing 18a may be mounted along inner surface 16b of bezel portion and may be pressed against the inner surface when illumination device 18 is snapped or attached to bezel portion 16 (or optionally, the housing and/or light pipe element may be spaced from the rear surface 16b of the bezel portion 16 when the illumination device is attached to the bezel portion or body of the pocket assembly). Optionally, a seal or gasket may be provided at the housing to bezel interface to limit or substantially preclude water and/or dirt intrusion into the illumination device. Likewise, the rear open portion 18g of housing 18a (that receive the circuit board 18b therein) may be partially or substantially filled or sealed with a potting or sealing material to limit or substantially preclude dirt and/or water intrusion into the illumination device and to the circuit element 18b disposed therein. Optionally, it is envisioned that the bezel portion 16 may be molded over a light pipe element or light guiding element (such as a light guiding element similar to light pipe element 18e), and the housing and circuit element of the illumination device may be snapped to the bezel portion (such as in a similar manner as discussed above) generally at and corresponding to the inmolded light guiding element, while remaining within the spirit and scope of the present invention.

Optionally, the illumination device receiving portion of body 13 and/or the inner wall or surface 14a of base portion 14 (FIG. 4A) may be painted or coated with a non-light transmitting coating or paint layer, whereby illumination from illumination device 18 does not flood the charge port area when the illumination device is activated, thus backlighting the indicia 20 and optionally providing a soft glow of illumination at the charge port area. Optionally, the material of base portion and bezel portion may be selected to have the light travel or be directed along the wall of base portion to provide illumination at the inboard end or bottom end of base portion 14 (so as to provide a colored or illuminated or glowing ring around the charge port). As shown in FIG. 4B, the mounting structure 15 at the vehicle may be configured to receive the body 13 of portal insert or pocket assembly 10 (not shown in FIG. 4B) with the illumination device (that may be attached to bezel portion 16) being received or disposed at a receiving portion 15a of mounting structure 15 behind where bezel portion 16 is positioned when body 13 is snapped or otherwise fastened or secured to mounting structure 15.

Thus, the pocket assembly (with the layers or coatings established at the bezel portion) of the present invention may be shipped to a vehicle manufacturing plant or facility. An operator at the facility may install the mounting structure to the vehicle and then may snap or otherwise fasten the body 13 and pocket assembly 10 to the mounting structure 15 to complete the assembly of the pocket assembly at the vehicle. The illumination device may be installed at or attached to the body 13 at the facility at which the pocket assembly is manufactured (such as by snapping the illumination device to locking or retaining tabs or elements at the bezel portion), or the illumination device may be shipped separately to the vehicle assembly facility and may be installed at the body 13 (such as by snapping the illumination device to locking or retaining tabs or elements at the bezel portion) at the vehicle assembly facility before the body 13 is attached to the mounting structure 15. An operator may install the illumination device and plug in any leads or contacts of the illumination device into an appropriate or corresponding electrical connector at the mounting structure or vehicle to electrically connect and electrically power the pocket assembly at the side of the vehicle.

Optionally, the illumination module 18 may comprise a self-contained module that includes a curved housing 18*a* that may substantially encase the illumination source and circuitry of the illumination module 18. The module and housing may be substantially sealed so as to be substantially impervious to water, dirt, debris and the like, so that the module is well suited for the exterior application at the charge port of the vehicle.

The housing of illumination module 18 may be at least partially or substantially translucent or transparent at least at illumination regions at or behind the indicia 20, such that illumination emitted via the illumination source or illumination sources is transmitted through housing 18*a* at the illumination regions and through the bezel portion and indicia. The illumination regions may have a lens or aperture thereat and within the housing to direct the light in the desired direction and in the desired manner. The illumination regions of the housing may provide a diffusing optic or diffusing effect or frosting to diffuse or spread out the emitted light to provide substantially uniform illumination or backlighting at the indicia and to limit or substantially preclude bright spots at the indicia when the illumination device is activated.

Optionally, and desirably, the housing may be overmolded over the illumination source or sources and circuitry to provide a substantially sealed and substantially water impervious illumination module. For example, the housing may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

Thus, the pocket assembly 10 provides a backlit or glowing indicia at the bezel portion to provide an enhanced appearance of the charge port area of the vehicle. The glowing or backlit indicia may be colored (such as, for example, blue or other desired color), such as via the colored material or resin selected for molding the bezel portion. Optionally, the base portion may allow light passage therethrough to further illuminate the charge port area when the illumination device is activated. Optionally, the illumination device may include colored lights (such as blue LEDs or the like) to provide the colored back lighting of the indicia, whereby the base portion and bezel portion may comprise a clear translucent material, if desired.

The illumination device or module may be activated in response to an activating or triggering event or input, such as in response to at least one of a touch of the cover panel, a movement of the cover panel (such as when the cover panel is opened by a user to access the charge port), actuation of a remote transmitting device (such as a key fob or the like), a passive entry device, a motion detection at the side of the vehicle, and/or the like. The illumination device or module may be automatically deactivated, such as following a period of time after activation or after plugging in the charging source to the charge port or such as in response to the cover panel being closed by a user after the vehicle has been charged. Optionally, the light module and/or illumination source or sources may have a dimming control feature or function, such that the illumination device, when activated, is ramped up or progressively powered up to its full illumination state, and when deactivated, is ramped down or dimmed or progressively powered down to its deactivated state. Optionally, the illumination device or module may modulate or vary the illumination (such as by flashing or varying the intensity of the illumination), such as in response to the vehicle being plugged in or charging and/or in response to a degree of charging of the vehicle, such as to indicate when the vehicle power source is fully charged.

Figure 5:
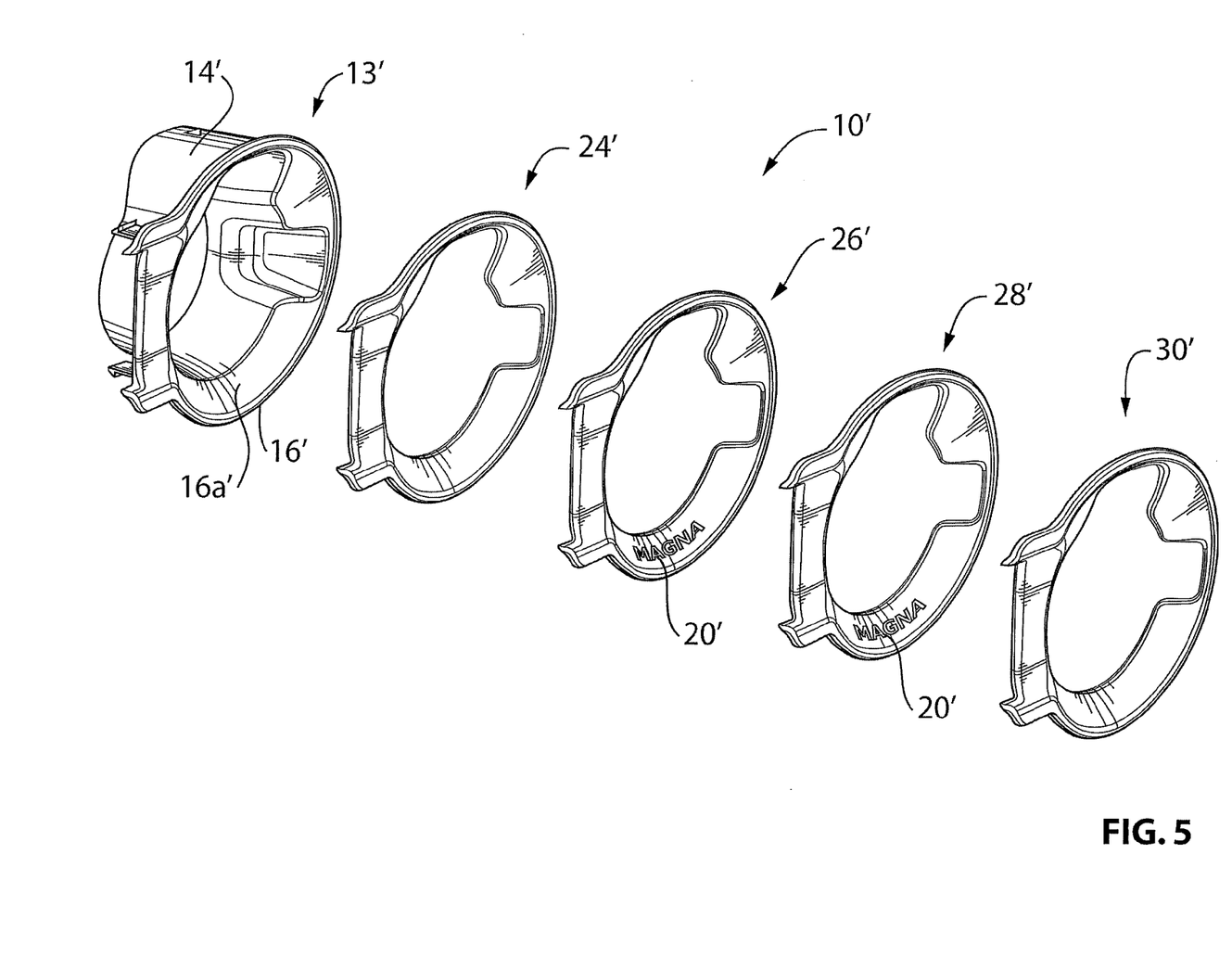
FIG. 5 is an exploded perspective view of another pocket assembly of the present invention.

Optionally, and with reference to FIG. 5, a pocket assembly or portal insert 10' may include a body 13' (having a base portion 14' and bezel portion 16') that is formed of a translucent clear (or substantially clear) plastic or polymeric material, such as, for example, a translucent clear resin (or any other material depending on the particular application and desired appearance of the indicia and/or pocket assembly). Pocket assembly 10' may include a translucent layer or coating 24', such as a translucent colored paint or coating (such as a translucent blue (or other color) paint or coating or the like), established at an outer surface or portion 16*a*' of bezel portion 16', with an opaque layer or coating 26', such as a dark (such as black) paint or other suitable dark paint or layer or coating, established or applied over the translucent layer 24', and with a layer of lighter (such as silver) paint 28' (or other suitable lighter paint or layer or coating) established over the dark or opaque layer 26', and with a clear coat or protective coat 30' disposed or established or applied to bezel portion 16' at and over the layers or coatings 24', 26', 28'. The layers 24', 26', 28' may be established or coated or applied to the outer surface 16*a*' of bezel portion 16', whereby the indicia 20' (such as the name or logo of the vehicle or vehicle manufacturer or any other text or icon or the like) may be etched (such as by laser etching or the like) through the layers 26', 28', so that the translucent blue layer 24' (or other colored coating or material) at bezel portion 16' may be exposed and viewable at the laser etched indicia. Thus, the outer clear coat 30' provides a continuous outer surface and fills in or encompasses the indicia whereby the colored layer 24' is viewable through the translucent or at least partially transparent clear coat 30' to provide colored indicia on a silver (or other colored) bezel portion, such as in a similar manner as described above.

Optionally, the base portion and bezel portion may be molded to an appliqué or outer element that provides the indicia at the bezel portion of the pocket assembly. For example, and with reference to FIG. 6, a pocket assembly or portal insert 110 may include a body 113 having a base portion 114 and a bezel portion 116, with an appliqué or outer element 126 and an outer clear resin or coating 130. Optionally, the appliqué 126 may be formed and the indicia 120 may be established (such as via screen printing or the like) at the appliqué 126 (and the appliqué may be formed out of any suitable or desirable material, such as an opaque material, such as a colored material, such as a silver colored material or the like). The appliqué 126 (particularly if comprising an interior type material that may not be suited for exterior applications and may not withstand exposure to exterior conditions) may then be in-molded into a clear resin material 130 to establish a clear coated appliqué for applying to or establishing at the bezel portion of the pocket assembly.

Figure 6:
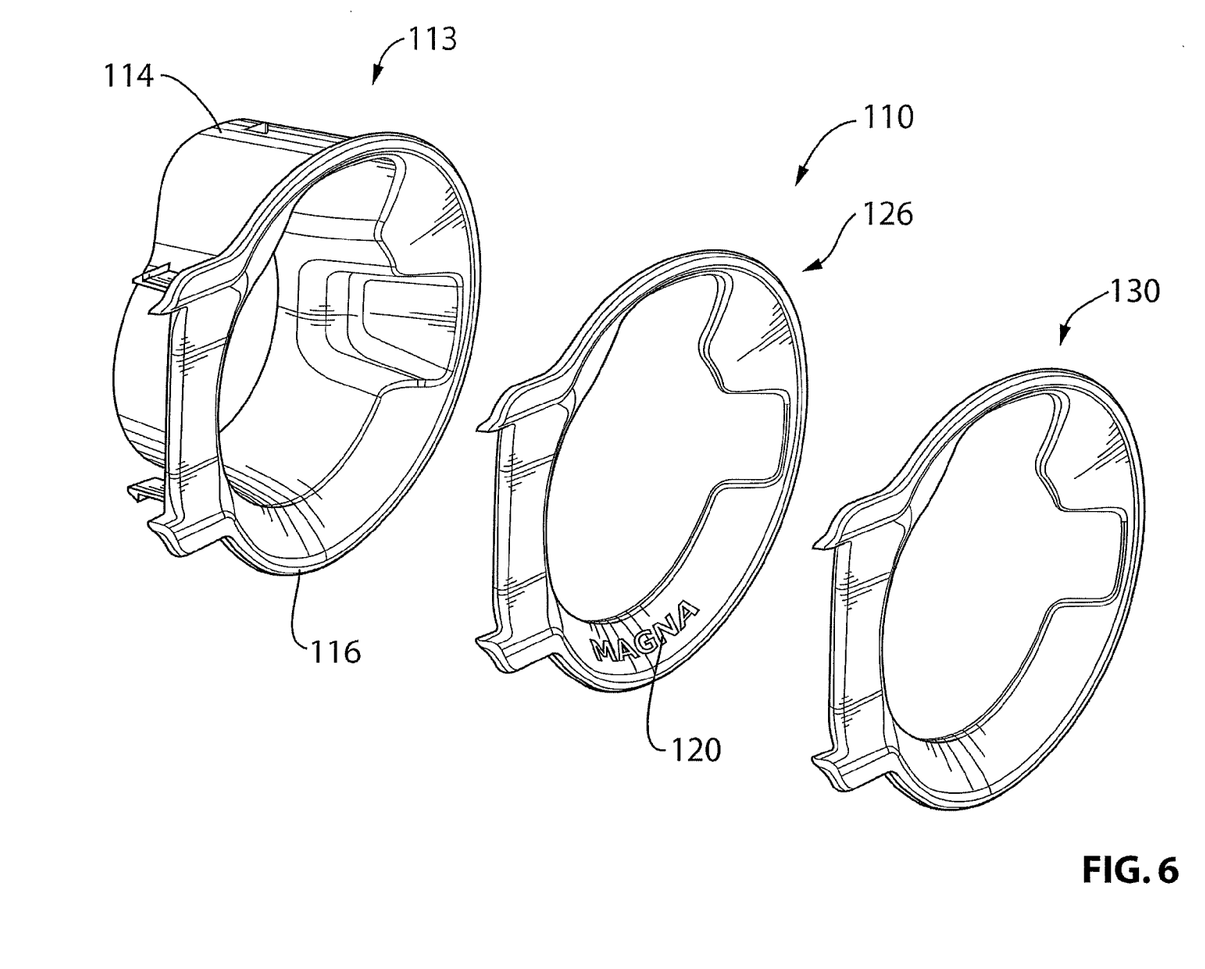
FIG. 6 is an exploded perspective view of another pocket assembly of the present invention.

Optionally, and desirably, the base portion 114 and bezel portion 116 may be insert molded to the clear coated appliqué to form the pocket assembly. The base portion 114 and bezel portion 116 may be molded out of a translucent colored resin material (such as a translucent blue resin material) to provide a colored backlit indicia, such as in a similar manner as described above, while the outer clear coat 130 provides a continuous outer surface whereby the colored bezel portion 116 is viewable through the appliqué 126 and translucent or at least partially transparent clear coat 130 to provide colored indicia on a colored bezel portion, such as in a similar manner as described above.

Figure 7:
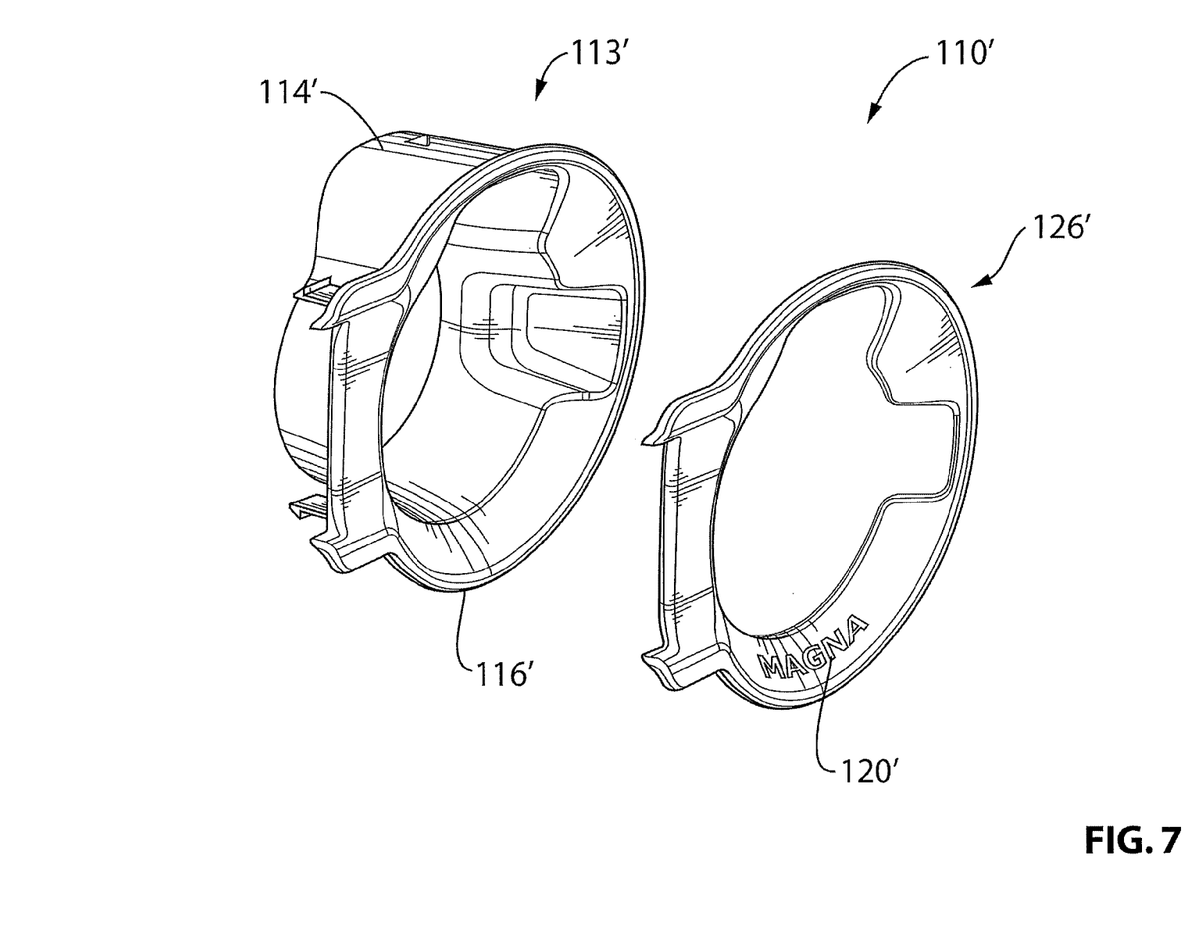
FIG. 7 is an exploded perspective view of another pocket assembly of the present invention.

Optionally, and with reference to FIG. 7, a pocket assembly or portal insert 110' may include a body 113' having a base portion 114' and a bezel portion 116', with an appliqué 126' that may be formed with the indicia 120' established (such as via screen printing or the like) at the appliqué 126 (and the appliqué may be formed out of any suitable or desirable material, such as an opaque material, such as a colored material, such as a silver colored material or the like). Optionally, and desirably, the base portion 114' and bezel portion 116' may be insert molded to the appliqué 126' to form the pocket assembly. The base portion 114' and bezel portion 116' may be molded out of a translucent colored resin material (such as a translucent blue resin material) to provide a colored backlit indicia, such as in a similar manner as described above.

Figure 8:
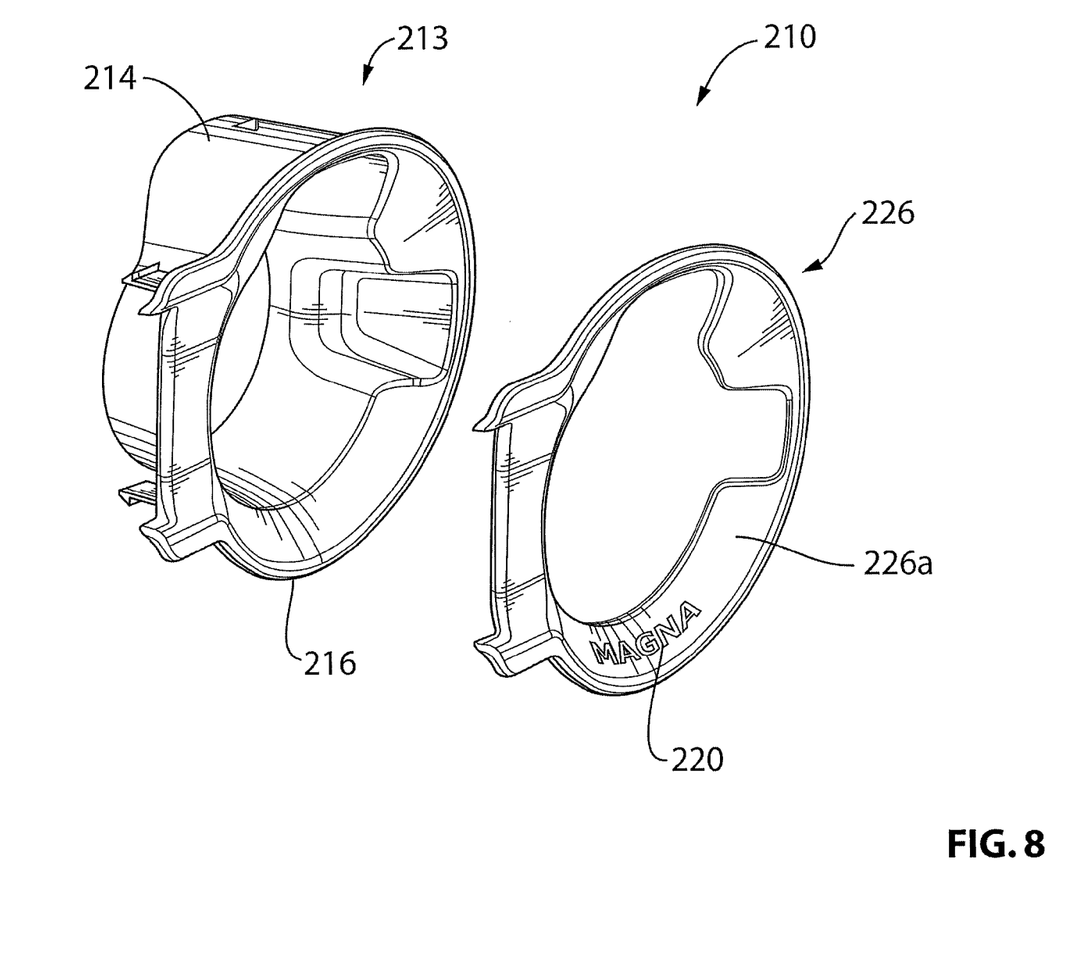
FIG. 8 is an exploded perspective view of another pocket assembly of the present invention.
Figure 8A:
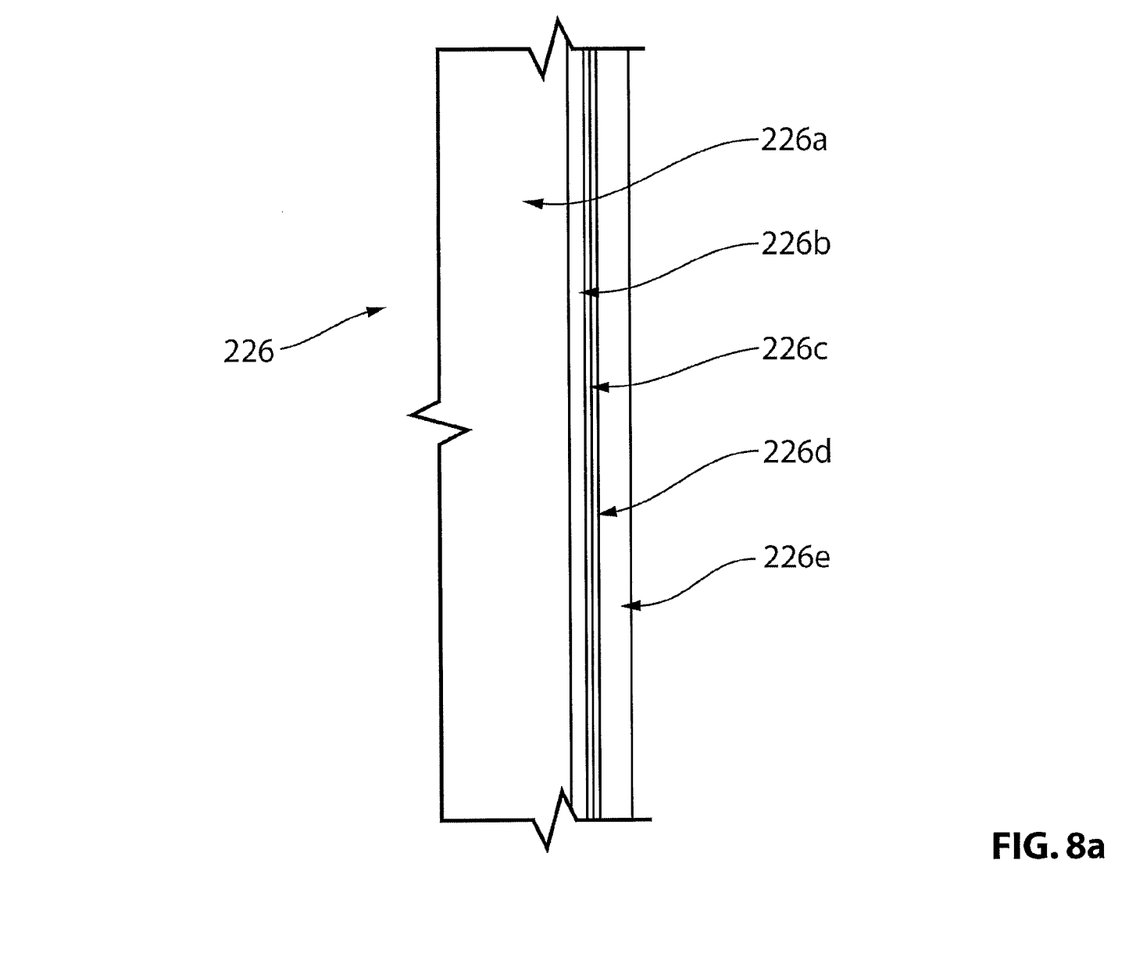
FIG. 8A is a sectional view of the pocket assembly of FIG. 8.

Optionally, and with reference to FIGS. 8 and 8A, a pocket assembly or portal insert 210 may include a body 213 having a base portion 214 and a bezel portion 216, with an appliqué or outer cover element 226 adhered to or applied to bezel portion 216. Optionally, and as shown in FIG. 8A, appliqué 226 may comprise an outer clear film or layer 226a (such as a thermoplastic fluoropolymer, such as a highly non-reactive and pure thermoplastic fluoropolymer, such as a polyvinylidene fluoride (PVDF) film or layer or the like), with a chrome or silver or metallic coating 226b (or other colored or opaque coating or material depending on the desired appearance of the bezel portion at the charge port area) established at an inner surface of outer clear layer 226a. A clearcoat 226c may be established at the chrome coating 226b, and an opaque or dark coating or layer 226d may be established at clearcoat 226c. The darkened layer or opaque layer may be provided or established so that the indicia is visible (to a person viewing the charge port area when the pocket assembly is normally mounted at the vehicle) when the illumination device is activated, but when the illumination device is deactivated, the indicia is not readily visible or viewable or discernible through the opaque layer to a person viewing the charge port and pocket assembly. The indicia 220 may be established at the opaque layer 226d (such as by reverse printing of the indicia at and through the opaque layer 226d but not through the clearcoat 226c and other coatings or layers 226b, 226a). Appliqué 226 may include an adhesive layer 226e (such as a clear pressure sensitive adhesive layer or the like) at its inner surface for adhering the appliqué 226 to the bezel portion 216 (which may comprise any suitable material, such as a clear or non-clear plastic or polymeric or metallic material or the like).

Optionally, the base portion and bezel portion of the pocket assembly may comprise stamped metallic parts that are stamped (or otherwise formed or shaped) out of a metallic material or the like. For example, and with reference to FIG. 9, the body 313 (including the base portion 314 and bezel portion 316) may be unitarily stamped or formed of a metallic material. The stamping may then be placed into a mold to have the outer coating or layer or element (with the desired or selected colored materials) molded onto the outer surface of the bezel portion 316, such as in a similar manner as described above.

Figure 9:
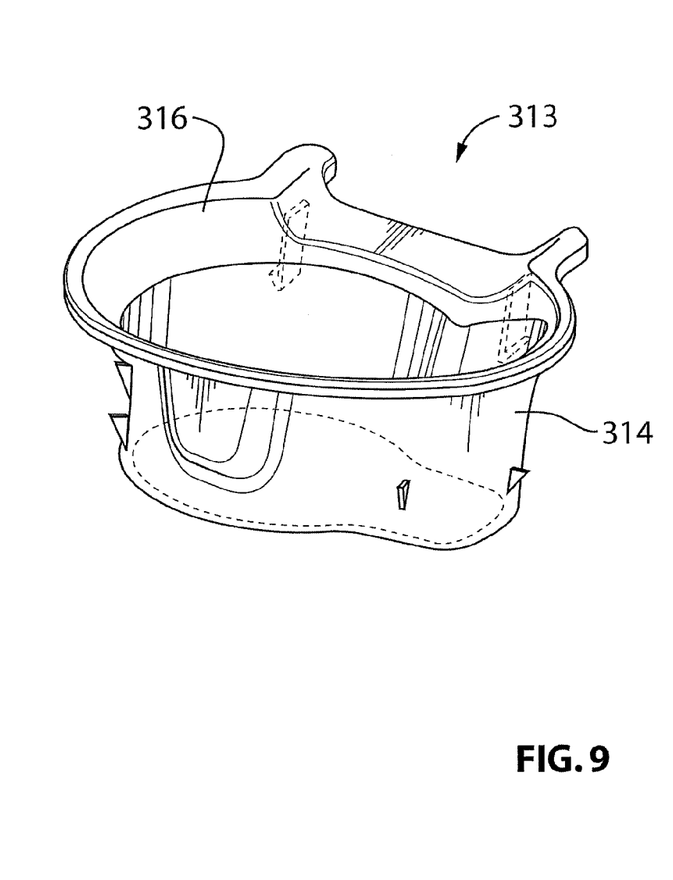
FIG. 9 is a perspective view of another pocket assembly of the present invention.

In order to allow the light from the illumination device to pass through the stamped metallic bezel portion 316, the indicia or characters are stamped or cut or pierced or established through the bezel portion 316. For example, the metallic material may be trimmed and formed and cut or finished at a multi-stage stamping process, and the lettering or indicia may be pierced or established at a secondary die station (however, it is envisioned that the indicia may be pierced or established at an initial piercing operation prior to the stamping and finishing of the formed base portion and bezel portion). Optionally, and desirably, the outer surface of the bezel portion may have a plastic protective film established thereon or applied thereto in order to protect the outer surface during the stamping and piercing processes. After the part has been stamped and pierced, the protective film may be removed from the outer surface of the bezel portion and the stamping may be placed into a cover side of a mold to have the outer element (such as an outer element similar to the outer element or appliqués discussed above) molded onto the bezel portion 316.

Figure 9A:
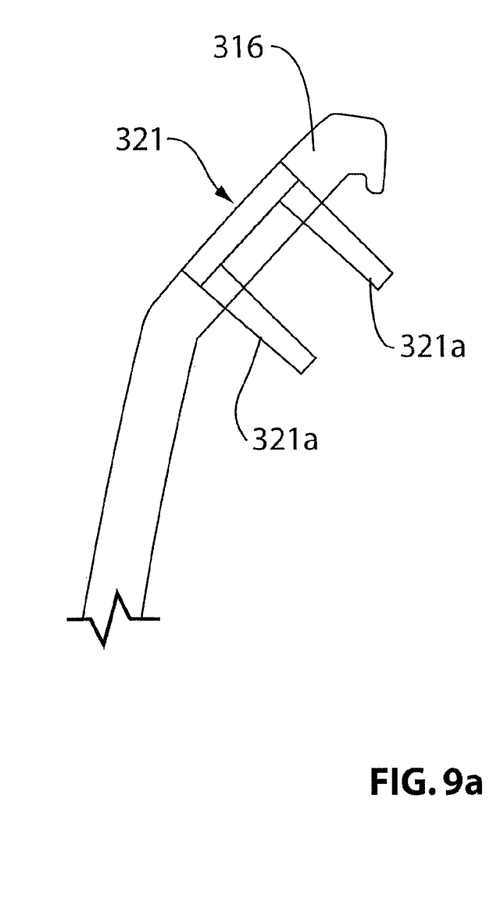
FIG. 9A is a sectional view of a portion of the pocket assembly of FIG. 9, showing the indicia.

If the indicia includes a letter or character or icon that has a center portion (such as the letter "O" or the like), the center portion may be removed during the stamping process and thus the character may not be properly shown or represented at the bezel portion. Optionally, the center portion of such characters may be removed during (or before or after) the piercing operation (or may be separately formed) and the separate center portion may be attached at the side of the molding press so that, when the outer element is molded over the outer surface of the bezel portion 316, the separate center portion of the character or characters is retained in the appropriate location at the bezel portion. Optionally, and as shown in FIG. 9A, the center portion 321 of a letter or character may be formed with tabs 321a that may be folded over to retain the center portion 321 at the appropriate location within an opening that defines the outline of the character or letter. The tabs may be folded over by an assembly machine that properly or accurately locates the center portion 321 and retains it at the appropriate location after the stamping process and before the molding of the outer element at the bezel portion 316.

Optionally, and with respect to any pocket assembly of the present invention, the illumination device or illumination module or light pipe may be received within the base portion and behind the bezel portion for emitting illumination through the bezel portion and through any outer cover or appliqué or coating established at or adhered to the bezel portion. The illumination device may include or comprise any suitable illumination source, such as one or more light emitting diodes (LEDs), such as white LEDs or high intensity power LEDs (such as the types described in U.S. Pat. Nos. 7,195,381 and/or 6,690,268, which are hereby incorporated herein by reference in their entireties) or organic light emitting diodes (OLEDs) or the like. The illumination source may comprise a substantially white light emitting illumination source, or may comprise a colored light emitting illumination source (or a white light emitting illumination source may emit light that passes through a color filter or the like) to provide color illumination (such as blue or other color as desired) at the charge port area or pocket, depending on the particular application of the pocket assembly and illumination module. For example, the illumination module may emit or transmit colored light that may match or correspond to an interior and/or exterior lighting scheme of the particular vehicle to which the pocket assembly is mounted.

Thus, the illumination module may comprise a single self-contained, sealed illumination module with one or more illumination sources or LEDs that are operable to illuminate or backlight the indicia at and partially around the charge port and/or to provide a soft illumination at and partially around the charge port. Thus, the illumination module may be configured as a sealed, self-contained illumination module with a lens or optical element, such as a simple lens, a potted design engineered lens or aperture. The optic elements may comprise any suitable material, such as a clear polycarbonate, a polystyrene, an acrylic or the like, for environmental robustness. The physical size and shape and position of the apertures for the light output may be selected to provide the desired light output, such as a desired intensity, diffuseness and/or direction of illumination emanating from the illumination module when the illumination sources are activated. A texture or frosting of the lens or lenses or optical elements may also be provided to spread or diffuse the light output of the illumination module. The illumination module may also include a capacitor or capacitors to limit damage from electro-static discharge. The illumination module also includes resistors, which are selected to ensure the same or substantially the same net light output of the illumination sources of the illumination device or module. The housing may be overmolded over the illumination source and circuitry of the illumination module to substantially seal the circuitry within the housing so as to provide a sealed illumination module for use in the pocket assembly. Optionally, the circuitry or components of the illumination device (such as the LED or LEDs and associated circuitry and/or the light pipe element) may be molded into the body itself. For example, a boardless illumination device may have the body molded over the light pipe element and/or the circuitry and illumination source or LED to encapsulate the components and/or circuitry within the body and at the bezel portion of the pocket assembly. Optionally, the circuitry of the illumination device may be molded into the housing of the illumination device so that the illumination device comprises a sealed or encapsulated device or module that may be readily attached to the body or bezel portion, such as in a similar manner as discussed above.

The illumination sources may illuminate or backlight the indicia and charge port region of the vehicle, and may utilize aspects of the illumination sources described in U.S. Pat. Nos. 6,280,069; 6,276,821; 6,176,602; 6,152,590; 6,149,287; 6,139,172; 6,086,229; 5,371,659, 5,669,699, 5,823,654 5,497,305; 5,938,321; 5,671,996; 5,497,305; 6,416,208; and/or 6,568,839, which are hereby incorporated herein by reference in their entireties. When activated, the illumination source preferably draws a low or minimal amount of energy from a power source, such as a vehicle battery (not shown) or the like, such that the battery or power source is not overly drained during the period of time that the illumination source is activated.

Changes and modifications to the specifically described embodiments may be carried out without departing from the principles of the present invention, which is intended to be limited only by the scope of the appended claims as interpreted according to the principles of patent law.

What is claimed is:

1. A pocket assembly for mounting at a recess of a vehicle body where a charge port of the vehicle is located, said pocket assembly comprising:
    a body mountable to a vehicle, wherein said body comprises a base portion and a bezel portion;
    at least one outer layer established at an outer surface of said bezel portion, wherein said at least one outer layer is viewable at the side of the vehicle when the charge port is being accessed by a user of the vehicle; and
    an illumination source disposed at or behind said bezel portion, said illumination source being operable to illuminate indicia established at or on said bezel portion.

2. The pocket assembly of claim 1, wherein at least one of said bezel portion and said at least one outer layer comprises a translucent colored material and wherein said indicia is illuminated by transmitting illumination through said translucent colored material.

3. The pocket assembly of claim 1, wherein said body comprises a colored polymeric material and wherein said at least one outer layer comprises an opaque coating with said indicia formed therethrough, whereby said indicia is illuminated in the color of said body when said illumination device is activated.

4. The pocket assembly of claim 3, wherein said at least one outer layer comprises a dark opaque coating established on an outer surface of said bezel portion and a lighter coating established on said dark opaque coating, and wherein said indicia is established through said dark opaque coating and said lighter coating.

5. The pocket assembly of claim 4, wherein said at least one outer layer comprises a translucent outer protective coating established over said lighter coating.

6. The pocket assembly of claim 3, wherein illumination from said illumination source is transmitted along and within said body portion to illuminate an inner end of said body portion opposite said bezel portion.

7. The pocket assembly of claim 1, wherein said body comprises a clear polymeric material and wherein said at least one outer layer comprises a translucent colored layer with at least one opaque coating established over said translucent colored layer and with said indicia formed through said at least one opaque coating, whereby said indicia is illuminated in the color of said translucent colored layer when said illumination device is activated.

8. The pocket assembly of claim 7, wherein said at least one opaque coating comprises a dark opaque coating established on an outer surface of said translucent colored layer and a lighter coating established on said dark opaque coating, and wherein said indicia is established through said dark opaque coating and said lighter coating.

9. The pocket assembly of claim 8, wherein said at least one outer layer comprises a translucent outer protective coating established over said lighter coating.

10. The pocket assembly of claim 1, wherein said at least one outer layer comprises an appliqué that is attached to said bezel portion, and wherein said appliqué has said indicia established at least partially therethrough.

11. The pocket assembly of claim 10, wherein said body is insert molded to said appliqué.

12. The pocket assembly of claim 10, wherein said appliqué comprises a translucent substantially clear material and wherein said body comprises a translucent colored material.

13. The pocket assembly of claim 10, wherein said appliqué comprises a translucent colored material.

14. The pocket assembly of claim 10, wherein said appliqué is adhered to an outer surface of said bezel portion.

15. The pocket assembly of claim 10, wherein said body comprises a stamped metallic body, and wherein said appliqué is molded over said bezel portion.

* * * * *